United States Patent
Lindén et al.

(10) Patent No.: US 11,723,313 B2
(45) Date of Patent: Aug. 15, 2023

(54) ELECTRIC POLE PRUNER

(71) Applicant: Fiskars Finland Oy Ab, Espoo (FI)

(72) Inventors: Olavi Lindén, Billnäs (FI); Jan Lindén, Turku (FI)

(73) Assignee: Fiskars Finland Oy Ab, Espoo (FI)

( * ) Notice: Subject to any disclaimer, the term of this patent is extended or adjusted under 35 U.S.C. 154(b) by 0 days.

(21) Appl. No.: 17/636,467

(22) PCT Filed: Aug. 20, 2020

(86) PCT No.: PCT/FI2020/050544
§ 371 (c)(1),
(2) Date: Feb. 18, 2022

(87) PCT Pub. No.: WO2021/038127
PCT Pub. Date: Mar. 4, 2021

(65) Prior Publication Data
US 2022/0287243 A1    Sep. 15, 2022

(30) Foreign Application Priority Data

Aug. 29, 2019  (FI) ...................................... 20195710

(51) Int. Cl.
*A01G 3/037* (2006.01)
*A01G 3/025* (2006.01)
*B26B 15/00* (2006.01)

(52) U.S. Cl.
CPC ........... *A01G 3/037* (2013.01); *A01G 3/0255* (2013.01); *B26B 15/00* (2013.01)

(58) Field of Classification Search
CPC ..... A01G 3/037; A01G 3/0255; A01G 3/0335
(Continued)

(56) References Cited

U.S. PATENT DOCUMENTS 2,504,405 A * 4/1950 Fletcher ................. A01G 3/033
    403/375
5,826,341 A * 10/1998 Massa ...................... A01G 3/08
    30/296.1
(Continued)

FOREIGN PATENT DOCUMENTS

CN    204518583 U  *  8/2015  ............. A01G 3/037
CN    105165427 A  *  12/2015  ............... A01G 3/04
(Continued)

OTHER PUBLICATIONS

International Search Report and Written Opinion for International Application No. PCT/FI2020/050544, dated Nov. 18, 2020, 10 pages.
(Continued)

*Primary Examiner* — Laura M Lee
(74) *Attorney, Agent, or Firm* — Foley & Lardner LLP

(57) ABSTRACT

An electric pole pruner having a spring returned cutting head and equipped with a drive unit having an electric motor coupled to a drum via an epicyclic gear assembly is configured to reduce rotation speed and to increase torque. A string element is coupled to the drum of the drive unit, and to the cutting head so as to actuate the cutting head. The pole pruner further includes a locking arrangement to selectively lock or release a ring gear of the gear assembly so as to convert rotation of the electric motor into rotation of the drum when the ring gear is locked, and to convert rotation of the drum into rotation of the ring gear when the ring gear is released.

13 Claims, 1 Drawing Sheet

(58) Field of Classification Search
USPC .................................. 30/228, 296.1, 247, 249
See application file for complete search history.

(56) References Cited

U.S. PATENT DOCUMENTS

| | | | | |
|---|---|---|---|---|
| 5,987,754 | A * | 11/1999 | Hirabayashi | B26B 15/00 30/228 |
| 7,987,603 | B2 * | 8/2011 | Pittau | A01G 3/0255 30/249 |
| 10,091,946 | B2 * | 10/2018 | Lindén | A01G 3/0255 |
| 10,172,292 | B2 * | 1/2019 | Zador | A01G 3/037 |
| 2009/0038162 | A1 * | 2/2009 | Shan | A01G 3/0255 30/249 |
| 2010/0192385 | A1 * | 8/2010 | Pittau | A01G 3/0255 30/249 |
| 2011/0258859 | A1 * | 10/2011 | Schofield | A01G 3/0255 83/571 |
| 2012/0011729 | A1 * | 1/2012 | Kim | A01G 3/037 30/228 |
| 2013/0227843 | A1 * | 9/2013 | Wason | B26D 1/30 30/247 |
| 2014/0173907 | A1 * | 6/2014 | Scott | B23D 21/10 30/92 |
| 2016/0029571 | A1 * | 2/2016 | Held | A01G 3/0255 30/249 |
| 2016/0318171 | A1 * | 11/2016 | Gonzales | A01G 3/085 |
| 2017/0099780 | A1 * | 4/2017 | Lindén | A01G 3/0255 |
| 2017/0354095 | A1 * | 12/2017 | Lindén | A01G 3/0255 |
| 2017/0359962 | A1 * | 12/2017 | Ma | A01G 3/037 |
| 2018/0272445 | A1 * | 9/2018 | Perkins | B23D 29/00 |
| 2019/0357444 | A1 * | 11/2019 | Lin | A01G 3/053 |
| 2022/0272905 | A1 * | 9/2022 | Huang | A01G 3/0255 |
| 2022/0287243 | A1 * | 9/2022 | Lindén | B26B 15/00 |

FOREIGN PATENT DOCUMENTS

| | | | | |
|---|---|---|---|---|
| CN | 105409607 | A * | 3/2016 | A01G 3/0335 |
| CN | 105475004 | A * | 4/2016 | A01G 3/037 |
| CN | 107810076 | A * | 3/2018 | A01G 3/037 |
| CN | 109452018 | A * | 3/2019 | A01G 3/0335 |
| CN | 209089481 | U * | 7/2019 | A01G 3/025 |
| CN | 113317053 | A * | 8/2021 | A01G 3/0255 |
| CN | 113906918 | A * | 1/2022 | A01G 3/0255 |
| DE | 9401672 | U1 * | 5/1994 | A01G 3/037 |
| DE | 19815009 | A1 * | 10/1999 | A01G 3/037 |
| DE | 10130452 | A1 * | 1/2003 | A01G 3/0255 |
| DE | 102018104638 | B4 * | 8/2021 | A01G 3/0255 |
| EP | 0 687 410 | A1 | 12/1995 | |
| EP | 1747710 | A1 * | 1/2007 | A01G 3/037 |
| KR | 20020035071 | A * | 5/2002 | A01G 3/02 |
| KR | 779515 | B1 * | 11/2007 | A01G 3/047 |
| KR | 100779515 | B1 * | 11/2007 | A01G 3/053 |
| WO | WO-2020094249 | A1 * | 5/2020 | A01G 3/0335 |

OTHER PUBLICATIONS

Search Report for Finnish Patent Application No. 20195710, dated Mar. 19, 2020, 1 page.

* cited by examiner

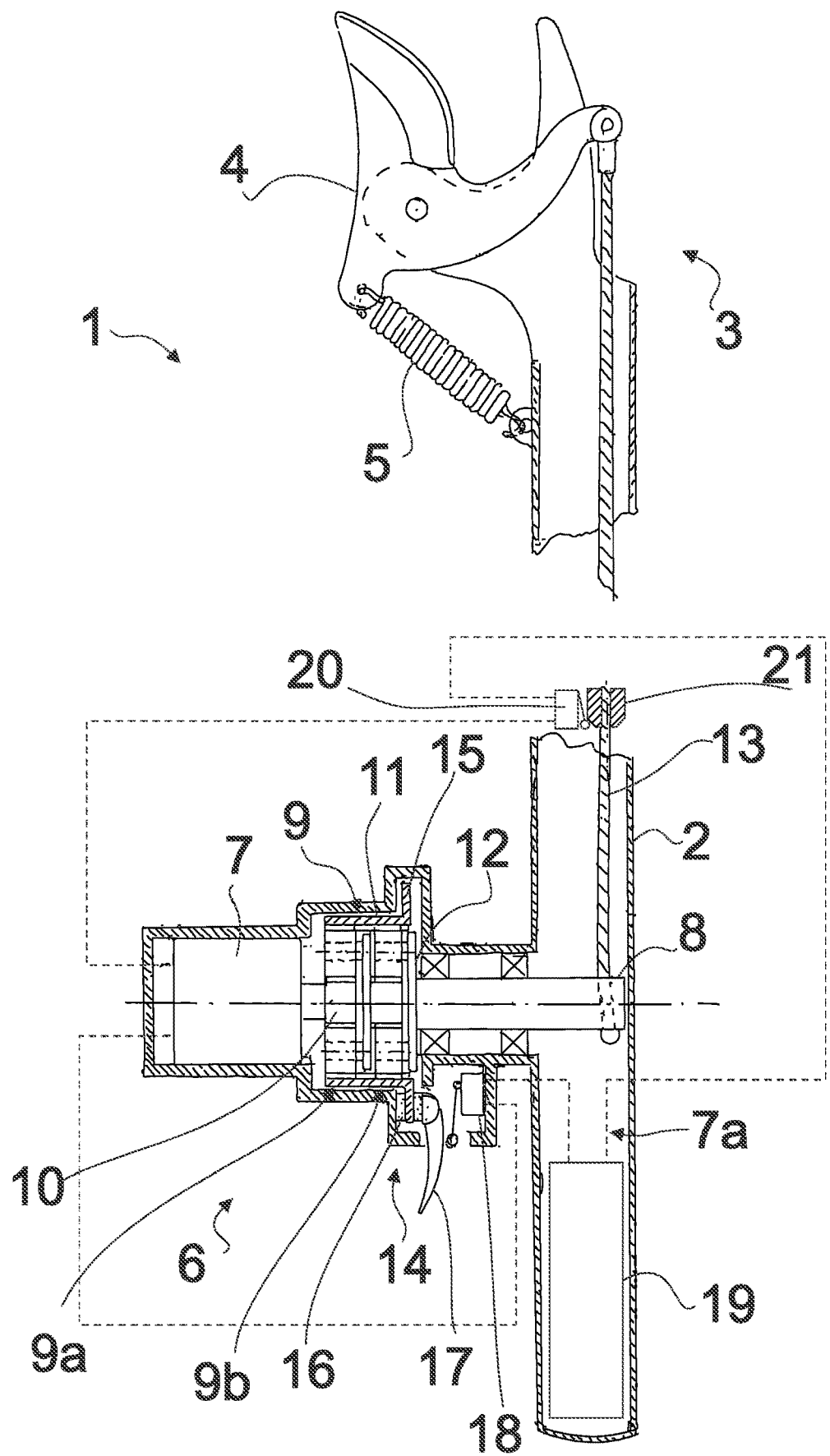

ELECTRIC POLE PRUNER

CROSS-REFERENCE TO RELATED APPLICATIONS

This Application claims the benefit of priority to international patent application number PCT/FI2020/050544, filed on Aug. 20, 2020, which claims the benefit of Finland patent application No. 20195710, filed on Aug. 29, 2019, the complete disclosures of which are hereby incorporated by reference for all purposes.

FIELD OF THE DISCLOSURE

The present disclosure relates to electric pole pruners, and more particularly to a drive unit for such pole pruners.

BACKGROUND OF THE DISCLOSURE

Commonly known electrically driven cordless pruners and pole pruners available on the market typically utilize drive systems based on a reciprocating screw drive, such as a ball screw or regular screw, often with two ends. The efficiency such screw drives is typically rather low, around 50%. Another drawback of such screw drives is the need to run the screw back and forth in a controlled way in order to achieve a cutting stroke and the return stroke, thus requiring additional control electronics and resulting in increased complexity and costs of manufacturing.

Other types of drives are also known. For example, publication DE 102016211978 A1 discloses an electric handheld pruner. In this arrangement, an electric motor actuates a drum, around which a wire is wound so as to achieve a pulling force that retracts the handles towards each other and causes a cutting motion of the blades towards each other. As the handles are spring biased away from each other, the return stroke of the blades away from each other is achieve without work done by the motor. A planetary gear has been used to reduce the output speed, and respectively increase the output torque of the electric motor. In order to facilitate the spring biased return motion of the handles and blades, the planetary gear is equipped with a one-way clutch so that the motion of the return stroke is de-coupled from the planetary gear and the electric motor. However, it is foreseen that such a one-way clutch is prone to premature wear, particularly in pole pruner applications where thicker branches are often cut. Additionally, the mechanism used in the disclosure discussed above is not optimal to be used in pole pruners, as placing the electrical drive in the immediate vicinity of the blades (attached to the handles) would result in a top-heavy arrangement having poor handling properties.

BRIEF DESCRIPTION OF THE DISCLOSURE

An object of the present disclosure is to provide an electric pole pruner having fast, reliable action that has improved handling properties.

The object of the disclosure is achieved by a pole pruner characterized by what is stated in the independent claim. The preferred embodiments of the disclosure are disclosed in the dependent claims.

The disclosure is based on the idea of providing an electric pole pruner with an epicyclic gear assembly, in which the ring gear can be selectively locked, or respectively released with a locking arrangement having a brake rotor and a brake caliper frictionally engaging the brake rotor, when the locking arrangement is actuated. On one hand, this enables power to be transmitted from an electric motor to the cutting mechanism via the epicyclic gear assembly when the ring gear is locked so as to actuate a cutting stroke. On the other hand, this enables a relatively light return-spring to be used for actuating a return stroke when the ring gear of the epicyclic gear assembly is released, thereby decreasing resistance of the return stroke by de-coupling the cutting mechanism from the electric motor and reducing resistance caused by the epicyclic gear assembly itself.

An advantage of the electric pruner according to the present disclosure is that the cutting capacity (i.e. thickness of the branches to be cut) can be increased, as locking arrangement of the ring gear can be constructed to withstand high torques, while simultaneously the power consumption thereof can be decreased, as the work done against the biasing member during the cutting stroke is reduced by virtue of the use of a smaller biasing member being enabled. A further advantage is that a relatively light-weight construction of the drive unit is achieved simultaneously with the other advantages.

BRIEF DESCRIPTION OF THE DRAWINGS

In the following, the disclosure will be described in greater detail by means of preferred embodiments with reference to the accompanying drawings, in which FIG. 1 illustrates an electric pole prune according to an embodiment of the present disclosure, as seen as a partial cut view along a longitudinal direction of the pole

DETAILED DESCRIPTION OF THE DISCLOSURE

According to the present disclosure, an electric pole pruner 1 is provided. The pole pruner comprises a longitudinal pole 2 extending along a longitudinal direction of the pole pruner 1. The longitudinal pole 2 may, for example, have a telescopic structure such that it can be extended and retracted, although other configurations may alternatively be used.

A cutting head 3 is provided at a cutting end of the longitudinal pole 2. The cutting head 3 comprises at least a knife 4 configured to move from a starting position to a cutting position (i.e. a cutting stroke) when the cutting head 3 is actuated by a pulling force. Preferably, but not necessarily, the pulling force is arranged to run along the longitudinal direction, most suitably towards an opposite end of the pole 2. The cutting head further comprises a biasing member 5 configured to return the knife 4 form the cutting position to the starting position (i.e., a return stroke) when the pulling force is no longer exerted on the cutting head 3. Most suitably, the biasing member 5 is provided as a coil spring, although other elastic arrangements suitable for storing energy may be used.

A drive unit 6 is provided on the longitudinal pole 2 at a distance from the cutting end. The drive unit comprises an electric motor 7 electrically coupled to a power input 7a, a drum 8 and an epicyclic gear assembly 9. Preferably, but not necessary, the electric motor 7 is a DC-motor of either the brushed or brushless type. Alternatively, also an AC-motor may be used. Most suitably, but not necessarily, the electric motor 7 has a nominal operating speed of between 15 000-20 000 rpm.

The epicyclic gear assembly, in turn, has at least an input sun gear 10 rotationally coupled with the electric motor 7, a ring gear 11 and an output planet carrier 12 rotationally coupled to the drum 8. Moreover, the gear assembly 9 is configured to reduce rotation speed and to increase torque transmitted from the electric motor 7 to the drum 8.

The electric pole pruner 1 further comprises a string element 13 coupled to the drum 8 of the drive unit 6, and to the cutting head 3, such that rotation of the drum 8 causes the string element 13 to wrap around to drum 8 so as to exert the pulling force on the cutting head 3 so as to actuate it via the string element 13. In the context of this disclosure, the term string element is used to depict an element flexible and curved in compression, but linear, rigid, and load-bearing in tension. Examples of such flexible elements include, but are not limited to, various ropes, wires, chains, cables and belts.

Particularly, the pole pruner 1 further comprises a locking arrangement 14 configured to selectively lock or release the ring gear 11 of the epicyclic gear assembly 9 so as to respectively enable or prevent rotation thereof. Moreover, the gear assembly is further configured to convert rotation of the electric motor 7 into rotation of the drum 8 when the ring gear 11 is locked, and to convert rotation of the drum 8 into rotation of the ring gear 11 when the ring gear 11 is released.

The locking arrangement 14 comprises a brake rotor 15 arranged on the outer peripheral of the ring gear 11, and a brake caliper 16 having at least a brake pad. Furthermore, the brake caliper 16 is configured to selectively lock the ring gear 11 by frictionally engaging the brake pads with the brake rotor 15, when actuated. Correspondingly, the brake caliper 16 is configured to selectively release the ring gear 11 from frictional engagement between the brake rotor 15 and the brake pad, when the brake caliper 16 is de-actuated. That is, the locking arrangement 14 may be provided as a disc-brake setup. Such a disc-brake configuration is considered particularly advantageous for heavy duty pruners (i.e., branches of 2" and above) where the reduction must be such that the cutting stroke is relatively slow and the return stroke relatively rapid. That is, in practice, the disc-brake configuration provides sufficient braking force to lock the ring gear 11 even when relatively high torque is transmitted through the epicyclic gear assembly 9.

However, other arrangements for providing the locking arrangement 14, such as a drum brake or band brake configurations, may alternatively be used.

Preferably, but not necessarily, the brake caliper 16 further comprises a lever 17 for actuating the brake caliper 16. In such a case, the electric pole pruner 1 most suitably further comprises an operating switch 18 for selectively engaging and disengaging the electrical coupling between the power input 7a and the electric motor 7, Moreover, the operating switch 18 is configured to power the electric motor 7 when the lever 18 is actuated, and to de-power the motor 7 when the lever 17 is de-actuated. Alternatively, an operating switch may be provided separate of a lever 17.

Advantageously, the lever 17 is configured to extend along the longitudinal direction of the pole pruner 1 and has an actuation motion towards the longitudinal pole 2, such that the lever 17 is actuatable by an index finger of an operator's hand gripping the longitudinal pole 2 in the vicinity of the lever 17.

According to an embodiment of the present disclosure the power input 7a is configured to receive and electrically couple with a battery unit 19. This enables cordless operation of the pole pruner. The pole pruner according to the present disclosure is seen as particularly suitable for cordless operation, as the efficiency of the drive unit 6 provides enables a prolonged operation time with a limited battery life. The capacity and voltage of the battery may be chosen in accordance with the operating voltage of the motor used. For example, batteries having a nominal voltage of 12-18V and a capacity of 1.5-5 Ah allow hundreds of cutting and return strokes with a single charge. Li-Ion batteries commonly available are considered particularly suitable, although other types of batteries may alternatively be used.

According to an embodiment of the present disclosure, the epicyclic gear assembly 9 comprises at least an input epicyclic gear train 9a and an output side epicyclic gear train 9b, so as to further reduce rotation speed and to increase torque transmitted from the electric motor 7 to the drum 8. Moreover, in such an arrangement the input sun gear 10 is a sun gear of the input side epicyclic gear train 9a and the output planet carrier 12 is a planet carrier of the output side epicyclic gear train 9b.

The epicyclic gear assembly 9 may additionally further comprise at least an intermediate epicyclic gear train positioned between the input epicyclic gear train 9a and the output epicyclic gear train 9b, so as to even further reduce rotation speed and to increase torque transmitted from the electric motor 7 to the drum 8.

Should the epicyclic gear assembly 9 comprise multiple gear trains, as discussed above, the ring gear 11 of the epicyclic gear assembly 9 may preferably, but not necessarily, be provided as at least two axially separate concentric ring gears. In such a case, the locking arrangement 14 is most suitably configured to selectively lock or release a ring gear associated to the input side epicyclic gear train 9a.

According to an embodiment of the present disclosure, the gear ratio of the epicyclic gear assembly 9 may be chosen form between 36:1 and 200:1, depending on various factors, such as output torque of the electric motor and the mechanical advantage of the cutting mechanism (e.g. diameter of the drum, size and shape of the cutting knife, and the mechanical advantage of the cutting head itself). Gear ratios between such a range have been found to be particularly suitable for covering most applications of electric pole pruners and cutting mechanism having various degrees of mechanical advantage.

According to an embodiment of the present disclosure, the outer diameter of the drum 8 decreases towards the centre of the drum. When the string element 13 is wound on the drum 8 starting from an axial end thereof towards the opposite axial end, the pulling force increases at the stage of the string element 13 being wound around the centre of the drum due to the decreased outer diameter, which also corresponds to the midway of the cutting stroke. Coincidentally, this also the point of the cutting stroke, where most force is needed, as the cutting line of a branch being cut is the longest at the middle of the branch.

According to an embodiment of the present disclosure, the electric pole pruner 1 further comprises a limit switch 20 configured to selectively disengage and restore the electrical coupling between the power input 7a and the electric motor 7. Moreover, the limit switch 20 is configured to disengage said electrical coupling when the cutting knife 4 has reached the cutting position thereof, and to restore said electrical coupling when the cutting knife 4 returns towards the starting position thereof, or has reached the starting position.

Preferably, but not necessarily, the limit switch 20 is an electromechanical switch, while the string element 13 is equipped with an engaging member 21 configured to actuate the limit switch 20 so as to disengage the electrical coupling between the electric motor 7 and the power input 7a, when said engaging member 21 is at position corresponding to the cutting position of the cutting knife 4.

FIG. 1 illustrates an electric pole pruner 1 according to an embodiment of the present disclosure, as seen as a partial cut view along a longitudinal direction of the pole 2. It should be noted that only the cutting end and the portion of the pole 2 associated with the drive unit 5 have been shown in FIG. 1

FIG. 1 shows the cutting head 3 being disposed at the cutting end of the longitudinal pole 2 with the cutting knife 4 in its starting position. The cutting knife 4 is pivotable towards a fixed knife by a pulling force of the string element 13 exerted on a first arm of the cutting knife 4 3. Moreover, the cutting knife 4 is biased towards its starting position by biasing member 5 provided as a coil spring attached, at one end, to a second arm of the cutting knife 4, and at the other end, to the fixed knife or the cutting end of the longitudinal pole 2.

The string element 13 extends between the cutting end 3 and the drive unit 6, namely the drum 8 thereof, around which it is wound during the cutting stroke. In FIG. 1, the string element runs within the longitudinal pole 2, although it may be envisaged to arrange the string element 13 to run along the pole 2 on the outside thereof, alternatively.

The drum 8 is arranged perpendicular with respect to the longitudinal pole 2 and is driven by the electric motor 7 via the epicyclic gear assembly 9.

Particularly, the epicyclic gear assembly has an input epicyclic gear train 9a and an output epicyclic gear train 9b with a shared ring gear 11. The output shaft of the electric motor 7 is coupled to the sun gear 10 of the input epicyclic gear train 9a. During the cutting stroke, the planet carrier 11 is locked, and the planet carrier of the input gear train 9a rotates the sun gear of the output epicyclic gear train. Respectively, the output planet carrier 12 of the output epicyclic gear train rotates the drum 8. The string element 13 thus winds around the drum 3 and pulls the first arm of the cutting knife 4 so as to pivot the cutting knife 4 towards the fixed knife to actuate the cutting stroke.

The ring gear 11 is locked or released by a locking arrangement 14, in which a brake rotor 15 is provided on the outer periphery of the ring gear 11. A brake caliper 16 is provided to frictionally engage brake pads with the brake rotor upon actuation of a lever 17 so as to lock rotation of the ring gear 11. When the lever 17 is de-actuated, the ring gear 11 is released, as the brake pads 16 are no longer pressed against the brake rotor 15.

The electric motor 7 is electrically coupled to a power input 7a which, in turn, is electrically coupled with a battery unit 19 so as to power the electric motor 7. An operating switch 18 is provided in connection with the lever 17 such that electric motor 7 is powered when the lever is actuated, and depowered, when the lever 17 is de-actuated. A limit switch 20 is also provided and configured to disengage the electrical coupling between the power input 7a and the electric motor 7 when the cutting knife 4 has completed the cutting stroke. The limit switch 20 is configured re-engage the electrical coupling between the power input 7a and the electric motor 7 when the cutting knife 4 has returned towards, or reached, the starting position, thereof. The limit switch 20 is actuated by an engaging member 21 attached to the string element 13. It should be noted that the FIG. 1 depicts the limit switch and engaging member at a position corresponding to a situation immediately prior to the cutting knife 4 reaching its cutting position (i.e. just before the cutting stroke has reached its end), such that any additional winding of the rope element 13 around the drum 8 will cause the limit switch 20 to disengage the electrical coupling. It should also be noted that this such a situation does not correspond to the cutting knife 4 depicted in FIG. 1

Furthermore, it should be noted that the present disclosure encompasses the combinations of the embodiments, and variations thereof, discussed above, in accordance with the appended Claims.

The invention claimed is:

1. An electric pole pruner, comprising
    a longitudinal pole extending along a longitudinal direction of the pole pruner;
    a cutting head provided at a cutting end of the longitudinal pole, the cutting head comprising:
        at least a knife configured to move from a starting position to a cutting position when the cutting head is actuated by a pulling, and
        a biasing member configured to return the knife form the cutting position to the starting position when the pulling force is no longer exerted on the cutting head,
    a drive unit provided on the longitudinal pole at a distance from the cutting end, the drive unit comprising:
        an electric motor electrically coupled to a power input;
        a drum;
        an epicyclic gear assembly having at least an input sun gear rotationally coupled with the electric motor, a ring gear and an output planet carrier rotationally coupled to the drum, wherein the gear assembly being configured to reduce rotation speed and to increase torque transmitted from the electric motor to the drum, and
    a string element coupled to the drum of the drive unit, and to the cutting head, such that rotation of the drum causes the string element to wrap around to drum so as to exert a pulling force on the cutting head so as to actuate it via the string element,
    wherein the pole pruner further comprises a locking arrangement configured to selectively lock or release the ring gear of the epicyclic gear assembly so as to respectively enable or prevent rotation thereof, and
    wherein the gear assembly being further configured to convert rotation of the electric motor into rotation of the drum when the ring gear is locked, and to convert rotation of the drum into rotation of the ring gear when the ring gear is released,
    wherein the locking arrangement comprises:
        a brake rotor arranged on the outer periphery of the ring gear, and
        a brake caliper having at least a brake pad, wherein the brake caliper being configured to selectively lock the ring gear by frictionally engaging the brake pads with the brake rotor, when actuated.

2. The electric pole pruner according to claim 1, wherein the brake caliper further comprises a lever for actuating the brake caliper.

3. The electric pole pruner according to claim 2, further comprising:
    an operating switch for selectively engaging and disengaging the electrical coupling between the power input and the electric motor,
    wherein the operating switch is configured to power the electric motor when the lever is actuated, and to de-power the motor when the lever is de-actuated.

4. The electric pole pruner according to claim 1, wherein the power input is configured to receive and electrically coupled with a battery unit.

5. The electric pole pruner according to claim 1, wherein the epicyclic gear assembly comprises at least an input epicyclic gear train and an output side epicyclic gear train, so as to further reduce rotation speed and to increase torque transmitted from the electric motor to the drum, and wherein the input sun gear is a sun gear of the input side epicyclic gear train and the output planet carrier is a planet carrier of the output side epicyclic gear train.

6. The electric pole pruner according claim 5, wherein the epicyclic gear assembly further comprises at least an intermediate epicyclic gear train positioned between the input epicyclic gear train and the output epicyclic gear train, so as to further reduce rotation speed and to increase torque transmitted from the electric motor to the drum.

7. The electric pole pruner according to claim 5, wherein the ring gear of the epicyclic gear assembly is provided as at least two axially separate concentric ring gears,
wherein the locking arrangement is configured to selectively lock or release a ring gear associated to the input side epicyclic gear train.

8. The electric pole pruner according to claim 1, wherein the epicyclic gear assembly has a gear ratio of between 36:1 and 200:1.

9. The electric pole pruner according to claim 1, wherein the outer diameter of the drum decreases towards the centre of the drum.

10. The electric pole pruner according to claim 1, further comprising:
a limit switch configured to selectively disengage and restore the electrical coupling between the power input and the electric motor,
wherein the limit switch is configured to disengage said electrical coupling when the cutting knife has reached the cutting position thereof, and to restore said electrical coupling when the cutting knife returns towards the starting position thereof.

11. The electric pole pruner according to claim 10, wherein the limit switch is an electromechanical switch, and wherein the string element is equipped with an engaging member configured to actuate the limit switch so as to disengage the electrical coupling between the electric motor and the power input, when said engaging member is at position corresponding to the cutting position of the cutting knife.

12. The electric pole pruner according to claim 2, wherein the lever being configured to extend along the longitudinal direction of the pole pruner and having an actuation motion towards the longitudinal pole, such that the lever is actuatable by an index finger of an operator's hand gripping the longitudinal pole in the vicinity of the lever.

13. The electric pole pruner according to claim 1, wherein the longitudinal pole has a telescopic structure such that the longitudinal pole may be extended and retracted.

* * * * *